United States Patent [19]

Pruett et al.

[11] 3,917,661

[45] Nov. 4, 1975

[54] HYDROFORMYLATION OF UNSATURATED ORGANIC COMPOUNDS

[75] Inventors: Roy L. Pruett, Charleston, W. Va.; James A. Smith, Cleveland Heights, Ohio

[73] Assignee: Union Carbide Corporation, New York, N.Y.

[22] Filed: Dec. 15, 1972

[21] Appl. No.: 315,648

Related U.S. Application Data

[60] Continuation of Ser. No. 1,278, Jan. 7, 1970, abandoned, which is a division of Ser. No. 658,055, Aug. 3, 1967, Pat. No. 3,527,809.

[52] U.S. Cl. ........ 260/410.9 R; 260/413; 260/465.1; 260/483; 260/491; 260/526 R; 260/561 R; 260/598; 260/599; 260/601 H; 260/602; 260/604 HF

[51] Int. Cl.² .................... C07C 67/30; C11C 3/00

[58] Field of Search ............... 260/483, 604 HF, 405, 410.9 R

[56] References Cited

UNITED STATES PATENTS

| | | | |
|---|---|---|---|
| 2,739,169 | 3/1956 | Hayemeyer | 260/533 A |
| 3,102,899 | 9/1963 | Cannell | 260/533 A |
| 3,168,553 | 2/1965 | Slough | 260/533 A |
| 3,579,552 | 5/1971 | Craddock et al. | 260/413 |
| 3,579,562 | 5/1971 | Weigert | 260/483 |
| 3,641,074 | 2/1972 | Fenton | 260/533 AN |
| 3,641,076 | 2/1972 | Booth | 260/533 AN |

*Primary Examiner*—Vivian Garner
*Attorney, Agent, or Firm*—S. R. Bresch

[57] ABSTRACT

An Oxo process using unsaturated organic reactants such as alkyl alkenoates to prepare oxygenated products comprising aldehydes which have unusually high normal to branched-chain isomer ratios. The process involves using a particularly characterized rhodium-containing complex catalyst under a specific combination of carefully controlled reaction conditions.

7 Claims, No Drawings

HYDROFORMYLATION OF UNSATURATED ORGANIC COMPOUNDS

This application is a continuation of application Ser. No. 1,278, filed Jan. 7, 1970, now abandoned, which was a divisional application of application Ser. No. 658,055, filed Aug. 3, 1967, now U.S. Pat. No. 3,527,809.

This invention relates to an improved process for the preparation of organic oxygenated compounds containing a high ratio of normal aldehydes to branched-chain aldehydes which comprises reacting certain olefinic compounds with carbon monoxide and hydrogen, under a specific combination of carefully controlled reaction conditions, in the presence of certain rhodium-containing complex catalysts and tertiary organo-containing ligands described hereinafter.

Processes directed to the production of reaction mixtures comprising substantial amounts of aldehydes and at times lesser amounts of alcohols by the reaction of olefinic compounds with carbon monoxide and hydrogen at elevated temperatures and pressures in the presence of certain catalysts are well-known in the art. The aldehydes and alcohols produced generally correspond to the compounds obtained by the addition of a carbonyl or carbinol group to an olefinically unsaturated carbon atom in the starting material with simultaneous saturation of the olefin bond. Isomerization of the olefin bond may take place to varying degrees under certain conditions with the consequent variation in the products obtained. Such processes are generally known in industry under varying names such as the Oxo process or reaction, oxonation, and/or hydroformylation.

One disadvantage of prior art hydroformylation processes is their dependence upon the use of catalysts such as cobalt octacarbonyl which require exceptionally high operative pressures to maintain such catalysts in their stable form. Another disadvantage is the difficulty in obtaining hydroformylation products which have a relatively high normal to branched-chain isomer ratio.

U.S. Pat. No. 2,880,241 by V. L. Hughes discloses that rhodium-containing catalysts are effective for oxygenating olefins thereby permitting "a more selective and a different kind of carbonylation." The patentee states that normally the cobalt catalyzed Oxo reaction produces a mixture of two or more isomers "whereas rhodium catalyzed carbonylation at low temperatures, such as 60°–120°C., permits the production of predominantly (75 to 90 percent) branched isomer"; column 1, lines 44–57 of U.S. Pat. No. 2,880,241.

U.S. Pat. No. 3,239,566 by L. H. Slaugh et al discloses that complexes of rhodium and phosphines catalyze the Oxo reaction to give oxygenated products predominating in aldehydes and/or alcohols. Slaugh et al. prefer to employ trialkylphosphine-rhodium-carbonyl complex catalysts at a temperature of from about 150°C. to about 210°C. The patentees' Examples disclose that their rhodium-containing catalyzed process results in oxygenated products having an isomer distribution of normal aldehydes to branched-chain aldehydes which is comparable to cobalt-containing catalyzed Oxo processes.

Quite unexpectedly and unobviously, indeed, we have discovered a novel process for preparing oxygenated products comprising aldehydes which have high normal to iso- or branched-chain isomer ratios. Such process involves using a certain class of rhodium-containing complexes to effectively catalyze, in the presence of tertiary organo-containing ligands, the Oxo reaction whereby certain olefinic compounds are reacted with hydrogen and carbon monoxide under a specific combination of conditions. In accordance with this invention the process variables which fall within critically specified limits are the (1) rhodium-containing complex catalyst, (2) olefinic feed, (3) tertiary organo-containing ligand and its concentration, (4) temperature range, and (5) total gas pressure, and (6) the partial pressures exerted by hydrogen and carbon monoxide. By the practice of the novel process we have been able to obtain oxygenated products in which the aldehydes thereof are highly enriched in the normal or straight-chain form, that is, isomer ratios of normal to branched-chain aldehydes as high as about 30:1, and higher, at respectable conversions have been obtained by the practice of the novel process.

The catalysts which are contemplated consist essentially of rhodium in complex combination with carbon monoxide and a ligand containing a trivalent atom of a Group VA element including phosphorus, arsenic, and antimony, said trivalent atom possessing one available pair of electrons. The ligand can be a tertiary organo phosphorus compound, a tertiary organo arsenic compound, or a tertiary organo antimony compound, and desirably wherein each organo moiety is composed of (1) carbon and hydrogen atoms, or (2) carbon, hydrogen, and aliphatic etheric oxygen atoms, each of the organo moieties being monovalently bonded to the trivalent Group VA element through a carbon atom or an aliphatic etheric oxygen atom thereof. The organo moieties can also contain other substituents such as cyano and halo, e.g., chloro. The term "aliphatic etheric oxygen atom," as used herein, is meant to convey the —O— group which does not form part of a heterocyclic ring such as, for example, dioxane. Consequently, the —O— groups present in, for instance, the trialkylphosphites or the triarylphosphites are considered, for purposes of our definition, to be "aliphatic etheric oxygen atoms." Strictly speaking, though, the oxygen atom in the trialkylphosphites and the triarylphosphites stem from the corresponding acid, i.e., phosphorous acid. As such various authorities consider the phosphite compounds to be esters. In its active form, the suitable complex catalysts will contain the rhodium component in a reduced valence state. This will normally be a zero valence state and may suitably be even lower, such as a minus one (−1) valence state. The term "complex" as used herein including the claims, means a coordination compound formed by the union of one or more electronically rich molecules or atoms capable of independent existence with one or more electronically poor molecules or atoms, each of which is also capable of independent existence. The suitable ligands, as indicated above, possess an element, i.e., phosphorus, arsenic, or antimony, which has one available or unshared pair of electrons. When such elements have this electronic configuration it is capable of forming a coordinate bond with rhodium.

It is essential that the aforesaid ligands possess a ΔHNP value of at least about 425, and preferably at least about 500. By "ΔHNP" is meant the difference in the half-neutralization potential between the ligand under consideration and N,N'-diphenylguanidine as determined according to the procedure set out in the article by C. A. Streuli, Analytical Chemistry, 32, 985–987 (1960). The ΔHNP value is a measure of the basicity of the ligand. For example, the relatively strong basic phosphorus-containing ligands such as those possessing a ΔHNP value substantially below 425 gave complexes that were ineffective in the practice of the invention as evidenced by a lack of a discernible reaction rate and/or low normal to branched-chained aldehydic product isomer ratios. Those phosphorus-containing ligands which possessed a ΔHNP value of at least about 425, and preferably at least about 500, are relatively less basic compounds. Complex catalysts prepared from such ligands effectively catalyzed the novel process whereby there resulted in a product mixture which contained a high normal to branched-chained aldehydic isomer ratio.

In Table A below, the ΔHNP values of several illustrative phosphorus-containing ligands are set out.

TABLE A

| LIGAND | Δ HNP[1] |
|---|---|
| $P(CH_3)_3$ | 114 |
| $P(C_2H_5)_3$ | 111 |
| $P(n-C_3H_7)_3$ | 115 |
| $P(n-C_4H_9)_3$ | 131 |
| $P(iso-C_4H_9)_3$ | 167 |
| $P(n-C_5H_9)_3$ | 139 |
| $P(2-n-C_4H_9OC_2H_4)_3$ | 162 |
| $P(2-C_6H_5C_2H_4)_3$ | 273 |
| $P(C_6H_{11})_3$ | 33 |
| $P(CH_3)(C_2H_5)_2$ | 117 |
| $P(CH_3)_2(C_2H_5)$ | 117 |
| $P(CH_3)_2(C_6H_5)$ | 281 |
| $P(C_2H_5)_2(C_6H_5)$ | 300 |
| $P(C_6H_{11})_2(2-CNC_2H_4)$ | 232 |
| $P(CH_3)_2(2-CNC_2H_4)$ | 291 |
| $P(n-C_4H_9)_2(2-CNC_2H_4)$ | 282 |
| $P(n-C_8H_{17})_2(2-CNC_2H_4)$ | 297 |
| $P(p-CH_3OC_6H_4)_3$ | 439 |
| $P(C_6H_5)_3$ | 573 |
| $P(C_6H_5)_2(C_2H_5)$ | 400 |
| $P(C_6H_5)_2(n-C_4H_9)$ | 400 |
| $P(O-n-C_4H_9)_3$ | 520 |
| $P(OCH_3)_3$ | 520 |
| $P(OC_6H_5)_3$ | 875 |

[1]E. M. Thorsteinson and F. Basolo. J. Am. Chem. Soc. 88, 3929–3936 (1966) C. A. Streuli, Analytical Chemistry, 32, 985–987 (1960)

Aside from possible exceptions, it is apparent from a consideration of Table A supra that tertiary organo phosphorus-containing ligands in which at least two of the organo moieties are alkyl and/or cycloalkyl groups are excluded from the scope of the invention. Classes of ligands which are excluded, therefore, are the trialkylphosphines, the tricycloalkyophosphines, the mixed (alkyl)(cycloalkyl)phosphines, the dialkylarylphosphines, the diarylalkylphosphines, and the dicycloalkylarylphosphines.

By way of illustrations, suitable classes of triorgano-containing ligands which are contemplated in the practice of the invention include the trialkylphosphites, the tricycloalkylphosphites, the triarylphosphites, the triarylphosphines, the triarylstibines, and the triarylarsines. Desirably each organo moiety in the ligand does not exceed 18 carbon atoms. The triarylphosphites and the triarylphosphines represent the preferred classes of ligands. Specific examples of ligands which are suitable in forming the complex catalysts include trimethylphosphite, triethylphosphite, butyldiethylphosphite, tri-n-propylphosphite, tri-n-butylphosphite, tri-2-ethylhexylphosphite, tri-n-octylphosphite, tri-n-dodecylphosphite, triphenylphosphite, trinaphthylphosphite, triphenylphosphine, tri(p-chlorophenyl)phosphite, tri-naphthylphosphine, phenyl diphenylphosphinite, diphenyl phenylphosphonite, diphenyl ethylphosphonite, triphenylarsine, triphenylstibine, tris(p-chlorophenyl)phosphine, tri(p-cyanophenyl)phosphite, tri(p-methoxyphenyl)phosphite, ethyl diphenylphosphinite, and the like. Triphenylphosphite and triphenylphosphine are examples of the most preferred ligands. Such preferred ligands resulted in complex catalysts which effectively catalyzed alpha olefinic compounds at highly satisfactory reaction rates and also yielded high normal to branched-chain aldehydic product isomer ratios.

For the sake of convenience and brevity and primarily since the tertiary organo phosphorus compounds are the ligands of choice, the invention shall oftentimes be exemplified by continually referring to such phosphorus-containing compounds. As indicated previously, the trivalent phosphorus-containing ligand should have a ΔHNP value of at least about 425. Moreover, these ligands should be free of interfering or so-called sterically hindered groups. Ligands such as the triarylphosphines and the triarylphosphites which are characterized by the presence of "bulky" groups, e.g., phenyl, tolyl, etc., in the ortho position of the aryl moieties have been observed to give catalyst complexes which are unsuitable in the practice of the invention.

The novel process contemplates alpha olefinic compounds as reactants in the novel process. Such alpha olefinic compounds are characterized by a terminal ethylenic carbon-to-carbon bond which may be a vinylidene group, i.e.,

or a vinyl group, i.e., $CH_2=CH-$. They may be straight-chain or branched-chain and may contain groups or substituents which do not essentially interfere with the course of the novel process. Such groups or substituents can be illustrated by

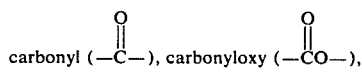

oxy (—O—), hydroxy (—OH), carboxy (—COOH), halo, alkoxy, phenyl, haloalkyl, etc. The alpha olefinic compound can contain one ethylenic bond or it can contain more than one ethylenic bond.

Illustrative alpha olefinic compounds which can be employed as reactants include propylene, 1-butene, 1-pentene, 1-hexene, 1-heptene, 1-octene, 1-decene, 1-dodecene, 1-octadecene, 2-ethyl-1-hexene, styrene, 3-phenyl-1-propene, allyl chloride, 1,4-hexadiene, 1,7-octadiene, 3-cyclohexyl-1-butene, allyl alcohol, hex-1-en-4-ol, oct-1-en-4-ol, vinyl acetate, allyl acetate, 3-butenyl acetate, vinyl propionate, allyl propionate, allyl butyrate, methyl methacrylate, 3-butenyl acetate, vinyl ethyl ether, vinyl methyl ether, allyl ethyl ether, n-propyl 7-octenoate, 3-butenoic acid, 7-octenoic acid, 3-butenenitrile, 5-hexenamide, and the like. Preferred alpha olefinic compounds include alkenes, alkyl alkenoates, alkenyl alkanoates, alkenyl alkyl ethers, and alkenols, especially those which contain up to 20 carbon atoms.

The novel process is effected in the presence of a catalytically significant quantity of the complex catalyst. The hydroformylation reaction will proceed when employing as little as about $1 \times 10^{-6}$ mol, and even lesser amounts, of rhodium (from the complex catalyst) per mol of alpha olefinic feed. However, such catalyst concentrations, though operable, are not particularly desirable since the reaction rate appears to be too slow and thus not commercially attractive. The upper catalyst concentration limit can be as high as about $1 \times 10^{-1}$ mol, and higher, of rhodium per mol of alpha olefinic feed. However, the upper limit appears to be dictated and controlled more by economics in view of the high cost of rhodium metal and rhodium compounds. No particular advantages at such relatively high concentrations are manifest. A catalyst concentration of from about $1 \times 10^{-5}$ mol to about $5 \times 10^{-2}$ mol of rhodium metal per mol of alpha olefinic feed is desirable. A concentration of from about $1 \times 10^{-4}$ to about $1 \times 10^{-2}$ mol of rhodium per mol of alpha olefin is preferred. Our observations generally indicate that optimum results are obtained by employing a catalyst concentration falling within the afore-defined preferred range. It is thus apparent that the concentration of the complex catalyst can vary over a rather wide range.

The concentration of ligand, e.g., the triorgano phosphorus ligand, to rhodium metal, on the other hand, is rather critical. Regardless whether one preforms the active complex catalyst prior to introduction in the hydroformylation reaction zone or whether the active catalyst species is prepared in situ during the hydroformylation reaction, it is essential that the reaction be effected in the presence of free ligand. By "free ligand" is meant the tertiary organo Group VA compounds as exemplified by triphenylphosphite that are not tied to or complexed with the rhodium atom in the active complex catalyst. Though we do not wish to be held to any theory or mechanistic discourse, it appears that the active catalyst species contains, in its simplest form, a concentration of triorgano phosphorus ligand and carbon monoxide equal to a total of four mols in complex combination with one mol of rhodium. Thus, the active species may comprise a complex catalyst mixture, in their monomeric forms, which are characterized by one, two, and/or three triorgano phosphorus molecules complexed with one molecule of rhodium. As can be surmised from the above discussion, carbon monoxide (which incidently is also properly classified as a ligand) is likewise present and complexed with the rhodium in the active species. In some instances, the active catalyst species may also contain hydrogen as a ligand. The ultimate composition of the active complex catalyst can be likened or attributable to the outcome of competing reactions between carbon monoxide and the triorgano phosphorus ligand for "complexing sites" with the rhodium element. These competing reactions can be disturbed or influenced, within significant limits, by increasing or decreasing the partial pressure due to carbon monoxide, or by increasing or decreasing the concentration of the triorgano phosphorus ligand. As a generalized statement, therefore, the component (carbon monoxide or triorgano phosphorus ligand) which can shift the equilibrium of the competing reaction in its favor should enjoy the greater opportunities of occupying the "complexing sites" with rhodium to give the active complex catalyst. One could view the function of free triorgano phosphorus ligand as either maintaining the status quo of the various forms of active complex catalyst during the hydroformylation, or as a means for shifting the equilibrium of the competing reactions in its favor and therefore causing additional triorgano phosphorus ligands to enter into complex combination with rhodium with the probable eviction of a similar number of carbon monoxide ligands from the complex catalyst. A consideration of the operative Examples herein such as Examples 16–19 adequately establishes that a critical variable of the novel process concerns the concentration of the triorgano phosphorus ligand. One could postulate that the unexpected and unobvious advantages which accrue from the practice of the invention are due, in part, to a carefully controlled and well-defined hydroformylation process in which the complexing affinity between the triorgano phosphorus ligand and rhodium appears to approach the maximum at the expense or minimization of the complexing attraction between the carbon monoxide ligand and rhodium.

In a desirable embodiment, the novel process is effected by employing a hydroformylation reaction mixture which contains at least about 2 mols of free triorgano phosphorus ligand per mol of rhodium. It is preferred that at least about 5 mols of free triorgano phosphorus ligand per mol of rhodium be employed. The upper limit does not appear to be narrowly critical and its concentration would be dictated largely by commercial and economic consideration. Operative Example 76 herein (employing a molar ratio of triphenylphosphine to rhodium of about 55:1) discloses an 88% conversion of the hex-1-ene feed to aldehydes which exhibited a normal/iso isomer ratio of approximately 30:1. A practical upper limit concerning the molar ratio of triorgano phosphorus ligand to rhodium would be approximately 100:1; an upper limit of about 30:1 is considered, for most instances, to be within the contemplated commercially attractive area.

A unique feature of the invention is the exceptionally low total pressures of hydrogen and carbon monoxide which are required to effect a commercial process. Total pressures of less than about 450 psia and as low as one atmosphere, and lower, can be employed with effective results. Total pressures of less than about 350 psia are preferred. A total pressure range of greater than about one atmosphere and less than about 250 psia is highly preferred since the unexpected and unobvious advantages discussed supra are readily attained when conducting our novel process at such low total pressures. The savings in equipment costs is readily apparent also.

The partial pressure of the carbon monoxide has been found to be an important factor in the novel process. It has been observed that a noticeable decrease occurs in the normal/iso aldehydic product isomer ratio as the partial pressure attributable to carbon monoxide approaches a value of about 75 per cent of the total gas pressure ($CO + H_2$). Operative Examples 14–15 which were conducted under comparable conditions reveals that an increase in the partial pressure attributable to carbon monoxide of from 25 to 75 percent of the total gas pressure employed resulted in a normal/iso aldehydic product isomer ratio which decreased from a value of about 9.0 to 3.8. Thus, the partial pressure attributable to carbon monoxide is desirably no greater than about 75 per cent of the total gas pressure ($CO + H_2$).

The residence period can vary from about a couple of minutes to several hours in duration and, as is well appreciated, this variable will be influenced, to a certain extent, by the reaction temperature, the choice of the alpha olefinic reactant, of the catalyst, and of the ligand, the concentration of the ligand, the total synthesis gas pressure and the partial pressure exerted by its components, and other factors. As a practical matter the reaction is effected for a period of time which is sufficient to hydroformylate the alpha or terminal ethylenic bond of the alpha olefinic reactant.

Solvents are not required in the practice of the invention but oftentimes their use is desirable and practical. One can employ normally-liquid organic solvents which are inert or which do not interfere to any substantial degree with the desired hydroformylation reaction under the operative conditions employed. Illustrative of such solvents include the saturated hydrocarbons, such as the pentanes, naphtha, kerosene, mineral oil, cyclohexane, etc. as well as the aromatic hydrocarbons, ethers, ketones, and nitriles as illustrated by benzene, xylene, toluene, diethyl ether, acetophenone, cyclohexanone, benzonitrile, and the like.

The preparation of the catalysts employed in the novel hydroformylation reaction is documented in the literature. A suitable method is to combine the rhodium salt of an organic acid with the ligand, e.g., triphenylphosphite, triphenylphosphine, etc., in liquid phase. The valence state of rhodium may then be reduced by hydrogenating the solution prior to the use of the catalysts therein. Alternatively, the catalysts may be prepared from a carbon monoxide complex of rhodium. For example, one could start with dirhodium octacarbonyl, and by heating this substance with the ligand, the ligand will replace one or more of the carbon monoxide molecules, thus producing the desired catalyst. It is also possible to start with the ligand of choice and rhodium metal; or an oxide of rhodium, and prepare the active catalyst species in situ during the hydroformylation reaction.

The following Examples are illustrative. In said Examples the procedure generally employed was as follows:

To a pressure vessel, there was charged the alpha olefinic compound, solvent, rhodium source, and ligand. After flushing with nitrogen, the pressure vessel was sealed and then pressurized with carbon monoxide and hydrogen. When reaction commenced, a noticeable pressure drop occurred. The pressure was maintained at a predetermined level by the periodic addition of hydrogen and carbon monoxide to the vessel. When the pressure remained generally constant, the reaction was considered to be complete. Thereafter, the vessel and contents were cooled to room temperature, i.e., about 23°C., the excess gases were vented, and the vessel was flushed three times with nitrogen. The contents were then removed and filtered. The filtrate was analyzed by vapor phase chromatography.

TABLE I[1]

| Example | Olefin | Catalyst | Gms | Solvent | Gms | Ligand | $pH_2/pCO$ | Total Atm. | Temp. °C. | Normal/Iso Aldehydes |
|---|---|---|---|---|---|---|---|---|---|---|
| 1 | but-1-ene | $[Co(CO)_4]_2$ | 0.25 | Toluene | 25 | None | 40:1 | 82 | 110° | 1.1:1 |
| 2 | but-1-ene | $[Co(CO)_4]_2$ | 0.25 | Toluene | 25 | None | 80:7 | 87 | 110° | 1.9:1 |
| 3 | but-1-ene | $[Co(CO)_4]_2$ | 0.25 | Toluene | 25 | None | 80:9 | 89 | 110° | 2.2:1 |
| 4 | but-1-ene | $[Co(CO)_4]_2$ | 0.25 | Toluene | 25 | None | 16:5 | 105 | 110° | 2.9:1 |
| 5 | but-1-ene | $[Co(CO)_4]_2$ | 0.25 | Toluene | 25 | None | 8:5 | 130 | 110° | 3.4:1 |
| 6 | but-1-ene | $[Co(CO)_4]_2$ | 0.25 | Toluene | 25 | None | 80:93 | 173 | 110° | 3.7:1 |
| 7 | but-1-ene | $[Co(CO)_4]_2$ | 0.25 | Toluene | 25 | None | 4:7 | 220 | 110° | 3.7:1 |

[1] Data taken from article by Piacenti et al, J. Chem. Soc., 1966, page 488
[2] Ratio of hydrogen pressure to carbon monoxide pressure.

TABLE II

| Ex. | Olefin | Gms | Catalyst[1] | Gms | Solvent | Gms | Ligand | Gms | $pH_2/pCO$[2] | Ligand/Rh[3] | Total psia | Temp. °C. | Reaction Time, min. | Normal/Iso Aldehydes |
|---|---|---|---|---|---|---|---|---|---|---|---|---|---|---|
| 8 | oct-1-ene | 112 | 5% Rh/C | 2.0 | toluene | 433 | $P(OO)_3$ | 10.0 | 1.5:1 | 32/1 | 2000 | 100–110 | 12 | 1.85:1.0 |
| 9 | oct-1-ene | 112 | 5% Rh/C | 15.0 | toluene | 171 | $P(OO)_3$ | 15.0 | 1:1 | 6.5/1 | 80–100 | 90 | 30 | 6:1 |
| 10 | oct-1-ene | 112 | 5% Rh/C | 15.0 | toluene | 171 | $P(OO)_3$ | 15.0 | 1:1 | 6.5/1 | 280–300 | 90 | 30 | 4.0:1 |
| 11 | oct-1-ene | 112 | 5% Rh/C | 15.0 | toluene | 171 | $P(OO)_3$ | 15.0 | 1:1 | 6.5/1 | 560–600 | 90 | 10 | 2.8:1 |
| 12 | oct-1-ene | 112 | 5% Rh/C | 5.0 | toluene | 171 | $P(OO)_3$ | 15.0 | 1:1 | 19.5/1 | 2500 | 85 | 36 | 2.2:1 |

[1] Weight percent Rhodium based on weight of carbon.
[2] Ratio of hydrogen pressure to carbon monoxide pressure.
[3] Ratio of moles of Ligand to moles of Rhodium.

TABLE III

| Ex. | Olefin | Gms | Catalyst[1] | Gms | Solvent | Gms | Ligand | Gms | $pH_2/pCO$[2] | Ligand/Rh[3] | Total psia | Temp. °C. | Reaction Time, min. | Normal/Iso Aldehydes |
|---|---|---|---|---|---|---|---|---|---|---|---|---|---|---|
| 13 | oct-1-ene | 112 | 5% Rh/C | 15.0 | toluene | 171 | $P(OO)_3$ | 15.0 | 1:1 | 6.5/1 | 80–100 | 90 | ~30 | 6:1 |
| 14 | oct-1-ene | 112 | 5% Rh/C | 10.0 | toluene | 171 | $P(OO)_3$ | 15.0 | 3:1 | 9.7/1 | 80–100 | 90 | ~30 | 9:1 |
| 15 | oct-1-ene | 112 | 5% Rh/C | 10.0 | toluene | 171 | $P(OO)_3$ | 15.0 | 1:3 | 9.7/1 | 80–100 | 90 | ~60 | 3.8:1 |

[1] Weight percent Rhodium based on weight of carbon.
[2] Ratio of hydrogen pressure to carbon monoxide pressure.
[3] Ratio of moles of Ligand to moles of Rhodium.

TABLE IV

| Ex. | Olefin | Gms | Catalyst[1] | Gms | Solvent | Gms | Ligand | Gms | $pH_2/pCO$[2] | Ligand/Rh[3] | Total psia | Temp. °C. | Reaction Time, min. | Normal/Iso Aldehydes |
|---|---|---|---|---|---|---|---|---|---|---|---|---|---|---|
| 16 | oct-1-ene | 112 | 5% Rh/C | 15.0 | toluene | 171 | $P(OO)_3$ | 5.0 | 1:1 | 2.2/1 | 80–100 | 90 | ~20 | 2.8:1 |
| 17 | oct-1-ene | 112 | 5% Rh/C | 15.0 | toluene | 171 | $P(OO)_3$ | 15.0 | 1:1 | 6.5/1 | 80–100 | 90 | ~30 | 6:1 |
| 18 | oct-1-ene | 112 | 5% Rh/C | 15.0 | toluene | 171 | $P(OO)_3$ | 30.0 | 1:1 | 13/1 | 80–100 | 90 | ~75 | 6.3:1 |
| 19 | oct-1-ene | 112 | 5% Rh/C | 15.0 | toluene | 171 | $P(OO)_3$ | 60.0 | 1:1 | 26/1 | 80–100 | 90 | ~100 | 8.3:1 |

[1] Weight percent Rhodium based on weight of carbon
[2] Ratio of hydrogen pressure to carbon monoxide pressure.
[3] Ratio of moles of Ligand to moles of Rhodium.

TABLE V

| Ex. | Olefin | Gms | Catalyst[1] | Gms | Solvent | Gms | Ligand | Gms | $pH_2/pCO$[2] | Ligand/Rh[3] | Total psia | Temp. °C. | Reaction Time, min. | Normal/Iso Aldehydes |
|---|---|---|---|---|---|---|---|---|---|---|---|---|---|---|
| 20 | propylene | 14 | 5% Rh/C | 5.0 | toluene | 64 | $P(OO)_3$ | 10.0 | 1:1 | 13/1 | 130–150 | 90 | 67 | 3.4:1[4] |
| 21 | propylene | 14 | 5% Rh/C | 5.0 | toluene | 64 | $P(OO)_3$ | 88 | 3:1 | 114/1 | 210–230 | 100 | 205 | 5.5:1[4] |
| 22 | hex-1-ene | 84 | 5% Rh/C | 10.0 | toluene | 171 | $P(OO)_3$ | 15.0 | 1:1 | 9.7/1 | 80–100 | 90 | ~40 | 5.9:1 |
| 23 | oct-1-ene | 112 | 5% Rh/C | 15.0 | toluene | 171 | $P(OO)_3$ | 15.0 | 1:1 | 6.5/1 | 80–100 | 90 | ~40 | 6:1 |
| 24 | dodec-1-ene | 168 | 5% Rh/C | 10.0 | toluene | 171 | $P(OO)_3$ | 15.0 | 1:1 | 9.7/1 | 80–100 | 80 | ~40 | 6:1 |

[1] Weight percent Rhodium based on weight of carbon
[2] Ratio of hydrogen pressure to carbon monoxide pressure.
[3] Ratio of moles of Ligand to moles of Rhodium.
[4] No alcoholic product.

TABLE VI

| Ex. | Olefin | Gms | Catalyst[1] | Gms | Solvent | Gms | Ligand | Gms | $pH_2/pCO$[2] | Ligand/Rh[3] | Total psia | Temp. °C. | Reaction Time, Min. | Normal/Iso Aldehydes |
|---|---|---|---|---|---|---|---|---|---|---|---|---|---|---|
| 25 | oct-1-ene | 112 | 5% Rh/C | 15.0 | toluene | 171 | $P(OO)_3$ | 15.0 | 1:1 | 6.5/1 | 80–100 | 90 | ~40 | 6:1 |
| 26 | oct-1-ene | 112 | 5% Rh/C | 10.0 | — | — | $P(OO)_3$ | 15.0 | 1:1 | 9.7/1 | 80–100 | 80–90 | ~40 | 4.5:1 |
| 27 | oct-1-ene | 112 | 5% Rh/C | 10.0 | toluene | 855 | $P(OO)_3$ | 15.0 | 1:1 | 9.7/1 | 80–100 | 90 | ~40 | 5.0:1 |

[1] Weight percent Rhodium based on weight of carbon.
[2] Ratio of hydrogen pressure to carbon monoxide pressure.
[3] Ratio of moles of Ligand to moles of Rhodium.

TABLE VII

| Ex. | Olefin | Gms | Catalyst | Gms | Solvent | Gms | Ligand | Gms | $pH_2/pCO$[2] | Ligand/Rh[3] | Total psia | Temp. °C. | Reaction Time, Min. | Normal/Iso Aldehydes |
|---|---|---|---|---|---|---|---|---|---|---|---|---|---|---|
| 28 | oct-1-ene | 112 | 5% Rh/C[1] | 15.0 | toluene | 171 | $P(OO)_3$ | 15.0 | 1:1 | 6.5/1 | 80–100 | 90 | ~40 | 6:1 |
| 29 | oct-1-ene | 112 | 0.5% Rh/Al$_2$O$_3$[1] | 100 | toluene | 171 | $P(OO)_3$ | 15.0 | 1:1 | 6.5/1 | 158–20 | 80 | 50 | 4.0:1 |
| 30 | oct-1-ene | 112 | 0.5% Rh/Al$_2$O$_3$[1] | 10 | toluene | 171 | $P(OO)_3$ | 15.0 | 1:1 | 6.5/1 | 160–50 | 90 | 270 | 5.8:1 |
| 31 | oct-1-ene | 112 | $(O_3P)_3$Rh(CO)H | 2.0 | toluene | 171 | $P(OO)_3$ | 15.0 | 1:1 | — | 80–100 | 90 | ~30 | 5.9:1 |
| 32 | oct-1-ene | 37 | Rh(CO)$_2$(AcAc)[4] | 0.04 | toluene | 149 | $P(OO)_3$ | 5.0 | 1:1 | — | 205–225 | 95 | 115 | 6.3:1 |
| 33 | oct-1-ene | 37 | $(O_3P)_3$Rh(CO)H | 0.6 | — | — | $P(OO)_3$ | 145 | 1:1 | — | 80–100 | 110 | ~200 | 12:1 |
| 34 | oct-1-ene | 19 | $(O_3P)_3$Rh(CO)H | 2.2 | toluene | 34 | — | — | 1:1 | — | 20–55 | 80–105 | 180 | 1:1.1 |
| 35 | oct-1-ene | 11.2 | $(O_3P)_3$Rh(CO)H | 2.3 | toluene | 64 | $P(OO)_3$ | 5.0 | 1:1 | — | 220–230 | 80–86 | 13 | 4.2:1 |

[1] Weight percent Rhodium based on weight of carrier.
[2] Ratio of hydrogen pressure to carbon monoxide pressure.
[3] Ratio of moles of Ligand to moles of Rhodium.
[4] AcAc represents acetylacetonate.

TABLE VIII

| Ex. | Olefin | Gms | Catalyst[1] | Gms | Solvent | Gms | Ligand | Gms | $pH_2/pCO$[2] | Ligand/Rh[3] | Total psia | Temp. °C. | Reaction Time, Min. | Normal/Iso Aldehydes |
|---|---|---|---|---|---|---|---|---|---|---|---|---|---|---|
| 36 | oct-1-ene | 112 | 5% Rh/C | 5.0 | toluene | 171 | $P(n-C_4H_9)_3$ | 10.0 | 1:1 | 20/1 | 2200 | 120 | 49 | 2.3:1 |
| 37 | oct-1-ene | 112 | 5% Rh/C | 15.0 | toluene | 171 | $P(n-C_4H_9)_3$ | 10.0 | 1:1 | 6.7/1 | 80–100 | 90 | ~300 | 2.5:1 |

TABLE VIII-continued

| Ex. | Olefin | Gms | Catalyst[1] | Gms | Solvent | Gms | Ligand | Gms | $pH_2/pCO$[2] | Ligand/Rh[3] | Total psia | Temp. °C. | Reaction Time, Min. | Normal/Iso Aldehydes |
|---|---|---|---|---|---|---|---|---|---|---|---|---|---|---|
| 38 | oct-1-ene | 112 | 5% Rh/C | 15.0 | toluene | 171 | $PO_3$ | 12.0 | 1:1 | 6.1/1 | 80-100 | 90 | ~40 | 4.5:1 |
| 39 | oct-1-ene | 112 | 5% Rh/C | 10.0 | toluene | 171 | $P(O-n-C_4H_9)_3$ | 13.0 | 1:1 | 10.5/1 | 80-100 | 110 | ~60 | 4.3:1 |
| 40 | oct-1-ene | 112 | 5% Rh/C | 10.0 | toluene | 171 | [4] | 21.0 | 1:1 | 1.5/1 | 80-100 | ~60 | 6.1:1 | |
| 41 | oct-1-ene | 112 | 5% Rh/C | 10.0 | toluene | 171 | [4] | 21.0 | 1:1 | 11.5/1 | 80-100 | 110 | ~60 | 5.4:1 |
| 42 | oct-1-ene | 112 | 5% Rh/C | 10.0 | toluene | 171 | $P(OC_2H_5)_3$ | 8.5 | 1:1 | 10.5/1 | 80-100 | 120 | ~60 | 4.5:1 |
| 43 | oct-1-ene | 112 | 5% Rh/C | 10.0 | toluene | 171 | $P(O-n-C_{10}H_{21})_3$ | 25.0 | 1:1 | 11/1 | 80-100 | 115 | ~80 | 4.9:1 |
| 44 | oct-1-ene | 112 | 5% Rh/C | 10.0 | toluene | 171 | $O_2P(OC_2H_5)$ | 15.0 | 1:1 | 13/1 | 80-100 | 92-98 | 170 | 6.0:1 |

[1]Weight percent Rhodium based on weight of carbon.
[2]Ratio of hydrogen pressure to carbon monoxide pressure.
[3]Ratio of moles of Ligand to moles of Rhodium.
[4]Tris(2-ethylhexyl)phosphite.

TABLE IX

| Ex. | Olefin | Gms | Catalyst[1] | Gms | Solvent | Gms | Ligand | Gms | $pH_2/pCO$[2] | Ligand/Rh[3] | Total psia | Temp. °C. | Reaction Time, Min. | Normal/Iso Aldehydes |
|---|---|---|---|---|---|---|---|---|---|---|---|---|---|---|
| 45 | oct-1-ene | 112 | 5% Rh/C | 15.0 | toluene | 171 | triphenylphosphite | 15.0 | 1:1 | 6.5/1 | 80-100 | 90 | ~50 | 6:1 |
| 46 | oct-1-ene | 112 | 5% Rh/C | 10.0 | toluene | 171 | tri(o-phenylphenyl)phosphite | 20.0 | 1:1 | 7.5/1 | 80-100 | 90 | 30 | 1.1:1 |
| 47 | oct-1-ene | 112 | 5% Rh/C | 10.0 | toluene | 171 | tri(o-phenylphenyl)phosphite | 26.0 | 2:1 | 10/1 | 2500 | 120 | 38 | 2.0:1 |
| 48 | oct-1-ene | 112 | 5% Rh/C | 10.0 | toluene | 171 | tri(p-phenylphenyl)phosphite | 26.0 | 1:1 | 10/1 | 80-100 | 90 | ~40 | 5.8:1 |
| 49 | oct-1-ene | 112 | 5% Rh/C | 10.0 | toluene | 171 | tri(p-chlorophenyl)phosphite | 20.0 | 1:1 | 10/1 | 80-100 | 90 | ~60 | 13:1 |
| 50 | oct-1-ene | 112 | 5% Rh/C | 10.0 | toluene | 171 | tri(p-methoxyphenyl)phosphite | 20.0 | 1:1 | 10/1 | 80-100 | 100 | 270 | 5.0:1 |

[1] Weight percent Rhodium based on weight of carbon.
[2]Ratio of hydrogen pressure to carbon monoxide pressure.
[3]Ratio of moles of Ligand to moles of Rhodium.

TABLE X

| Ex. | Olefin | Gms | Catalyst[1] | Gms | Solvent | Gms | Ligand | Gms | $pH_2/pCO$[2] | Ligand/Rh[3] | Total psia | Temp., °C. | Reaction Time, Min. | Normal/Iso Aldehydes |
|---|---|---|---|---|---|---|---|---|---|---|---|---|---|---|
| 51 | methyl methacrylate | 33 | 5% Rh/C | 5.0 | toluene | 146 | $P(OO)_3$ | 5.0 | 1:1 | 6.5/1 | 90-100 | 90 | 95 | 5.0:1 |
| 52 | methyl methacrylate | 33 | 5% Rh/C | 1.3 | toluene | 146 | $P(OO)_3$ | 1.2 | 1:1 | 6.5/1 | 220-240 | 110 | 90 | 5.2:1 |
| 53 | methyl methacrylate | 33 | 5% Rh/C | 1.3 | toluene | 146 | $P(OO)_3$ | 1.2 | 1:1 | 6.5/1 | 110-115 | 100-110 | 75 | 24:1 |
| 54 | methyl methacrylate | 33 | 5% Rh/C | 1.3 | toluene | 146 | $P(OO)_3$ | 1.2 | 1:1 | 6.5/1 | 25-55 | 110 | | only normal |
| 55 | methyl methacrylate | 33 | $Rh(CO)_2(AcAc)$[4] | 0.1 | toluene | 146 | $P(OO)_3$ | 1.2 | 1:1 | 6.5/1 | 105-125 | 100-120 | 75 | 16:1 |

[1]Weight percent Rhodium based on weight of carbon.
[2]Ratio of hydrogen pressure to carbon monoxide pressure.
[3]Ratio of moles of Ligand to moles of Rhodium.
[4]AcAc represents acetylacetonate.

TABLE XI

| Ex. | Olefin | Gms | Catalyst[1] | Gms | Solvent | Gms | Ligand | Gms | $pH_2/pCO$[2] | Total psia | Temp. °C. | Reaction Time, Min. | Normal/Iso Aldehydes |
|---|---|---|---|---|---|---|---|---|---|---|---|---|---|
| 56 | oct-1-ene | 37 | 5% Rh/C | 5.0 | toluene | 64 | triphenylarsine | 5.0 | 1:1 | 210-235 | 70-90 | 13 | 3.7:1 |
| 57 | oct-1-ene | 37 | 5% Rh/C | 5.0 | toluene | 64 | triphenylstibine | 5.8 | 1:1 | 210-230 | 80-90 | 31 | 4.9:1 |
| 58 | oct-1-ene | 18.5 | 5% Rh/C | 2.5 | toluene | 34 | triphenylstibine | 30.0 | 4:1 | 110-130 | 100-110 | — | 7.3:1 |

[1]Weight percent Rhodium based on weight of carbon.
[2]Ratio of hydrogen pressure to carbon monoxide pressure.

TABLE XII

| Ex. | Olefin | Gms | Catalyst[1] | Gms | Solvent | Gms | Ligand | Gms | $pH_2/pCO$[2] | Ligand/Rh[3] | Total psia | Temp. °C. | Reaction Time, Min. | Normal/Iso Aldehydes |
|---|---|---|---|---|---|---|---|---|---|---|---|---|---|---|
| 59 | oct-1-ene | 37 | 5% Rh/C | 5.0 | toluene | 64 | triphenyl-phosphite | 5.0 | 1:1 | 6.5/1 | 200–220 | 75–90 | 12 | 5.0:1 |
| 60 | propylene | 7.0 | Rh(CO)$_2$(AcAc)[4] | 0.3 | toluene | 30 | tri(p-chlorophenyl)-phosphite | 30.0 | 3:1 | 63/1 | 220–240 | 110–115 | 137 | 12:1 |
| 61 | oct-1-ene | 37 | 5% Rh/C | 5.0 | toluene | 64 | triphenyl-phosphite | 5.0 | 1:1 | 6.5/1 | 200–270 | 70–80 | 24 | 4.5:1 |
| 62 | oct-1-ene | 112 | 5% Rh/C | 15.0 | toluene | 171 | triphenyl-phosphite | 15.0 | 1:1 | 6.5/1 | 10–158 | 90 | 27 | 6:1 |
| 63 | oct-1-ene | 112 | 5% Rh/C | 15.0 | toluene | 171 | triphenyl-phosphite | 15.0 | 1:1 | 6.5/1 | 15–150 | 90 | 25 | 10:1 |
| 64 | oct-1-ene | 112 | 5% Rh/C | 1.0 | toluene | 171 | triphenyl-phosphite | 15.0 | 1:1 | 100/1 | 80–100 | 120 | 210 | 5.0:1 |
| 65 | oct-1-ene | 112 | 5% Rh/C | 30.0 | toluene | 171 | triphenyl-phosphite | 30.0 | 1:1 | 6.5/1 | 60–80 | 65–70 | ~300 | 5.9:1 |
| 66 | oct-1-ene | 19 | 5% Rh/C | 0.67 | toluene | 64 | none | — | 1:1 | — | 2500 | 70 | 10 | 1.1:1 |
| 67 | oct-1-ene | 112 | 5% Rh/C | 15.0 | toluene | 171 | triphenyl-phosphite | 45 | 1:1 | 15/1 | 80–100 | 90 | 80 | 5.8:1 |
| 68 | oct-1-ene | 112 | 5% Rh/C | 10.0 | toluene | 171 | triphenyl-phosphite | 15 | 1:1 | 10/1 | 80–100 | 80 | 60 | 6.4:1 |
| 69 | oct-1-ene | 112 | 5% Rh/C | 10.0 | toluene | 86 | triphenyl-phosphite | 100 | 1:1 | 64/1 | 80–100 | 90 | 208 | 7.7:1 |
| 70 | oct-1-ene | 112 | 5% Rh/C | 10.0 | toluene | 171 | triphenyl-phosphite | 15.0 | 1:1 | 64/1 | 80–100 | 80–90 | 50 | 6.8:1 |
| 71 | oct-1-ene | 112 | 5% Rh/C | 10.0 | toluene | 171 | triphenyl-phosphite | 15.0 | 1:1 | 10/1 | 80–100 | 90 | 45 | 9:1 |
| 72 | oct-1-ene | 112 | 5% Rh/C | 10.0 | toluene | 87 | triphenyl-phosphite | 100 | 3:1 | 64/1 | 180–200 | 90 | 125 | 8.0:1 |
| 73 | oct-1-ene | 112 | RhCl(CO)(PO$_3$)$_2$ | 2.5 | toluene | 88 | triphenyl-phosphite | 100 | 1:1 | | 100–120 | 120 | 104 | 7.3:1 |
| 74 | oct-1-ene | 112 | 5% Rh/C | 10.0 | toluene | 88 | triphenyl-phosphite | 100 | 1:1 | 64/1 | 200–250 | 100 | | 7.2:1 |

[1] Weight percent Rhodium based on weight of carbon.
[2] Ratio of hydrogen pressure to carbon monoxide pressure.
[3] Ratio of moles of Ligand to moles of Rhodium.
[4] AcAc represents acetylacetonate.

EXAMPLE 75

Into a 1-liter stirred autoclave there was charged 84 grams (1.0 mole) of hex-1-ene, 150 grams of acetophenone, 25 grams of tri-n-butylphosphine, and 2.0 grams of tris(triphenylphosphine)rhodium carbonyl hydride, HRh(CO)(P$\phi_3$)$_3$. The autoclave then was charged with synthesis gas (CO + H$_2$) of a 1:1 ratio and the resulting contents were heated to 80°C. and held thereat for 103 minutes. The pressure was maintained at 120–160 psig by periodic addition of synthesis gas in a 1:1 ratio. The reaction was very slow as noted by the slow uptake of the synthesis gas (slow drop in pressure). After cooling the autoclave, the excess gases were vented and the contents removed. Analysis of the product showed 85 weight per cent unreacted hex-1-ene and 15 weight per cent aldehydes having a normal/iso ratio of 3.3/1. In this example, the molar ratio of tri-n-butylphosphine to rhodium was about 60:1.

EXAMPLE 76

Into a 1-liter stirred autoclave there was charged 84 grams (1.0 mole) of hex-1-ene, 150 grams of acetophenone, 35 grams of triphenylphosphine, and 2.0 grams of tris(triphenylphosphine)rhodium carbonyl hydride, HRh(CO)(P$\phi_3$)$_3$. The autoclave then was charged with 110 psig of synthesis gas (CO + H$_2$) of a 1:1 ratio and the autoclave and contents were heated to 80°C. and held at this temperature for 35 minutes. The pressure was maintained at 90–120 psig by periodic addition of 1:1 CO/H$_2$. A fast uptake of synthesis gas occurred and was completed at the end of the 35 minute period. The autoclave was cooled and the excess gases were vented. The liquid contents were removed and analyzed directly by vapor phase chromatography. Analysis of the product showed that 88 weight per cent of the olefin had been converted to aldehydes which had a normal/iso ratio of 30/1. It should be noted that the molar ratio of triphenylphosphine to rhodium was about 55:1.

EXAMPLE 77

A. In a manner similar to Example 9, when allyl acetate is employed in lieu of but-1-ene, there is obtained an isomeric mixture of aldehydic products rich in 3-formylpropyl acetate.

B. In a manner similar to Example 9, when 5-hexenamide is employed in lieu of but-1-ene, there is obtained an isomeric mixture of aldehydic products rich in 6-formylhexanamide.

C. In a manner similar to Example 9, when allyl ethyl ether is employed in lieu of but-1-ene, there is obtained a product mixture rich in 3-formylpropyl ethyl ether.

D. In a manner similar to Example 9, when hex-1-en-4-ol is employed in lieu of but-1-ene, there is obtained an isomeric mixture of aldehydic products rich in 5-hydroxyheptanal.

What is claimed is:

1. A process for the production of oxygenated products rich in normal aldehydes which comprises contacting (1) an alpha olefinic compound which is an alkyl alkenoate having up to 20 carbon atoms; (2) with carbon monoxide and hydrogen; (3) in the presence of a catalytic quantity of a complex catalyst consisting essentially of rhodium in complex combination with carbon monoxide and a triorgano phosphorus ligand of the group consisting of trialkylphosphites, tricycloalkylphosphites, triarylphosphites, and triarylphosphines wherein each organo moiety is a hydrocarbon and has up to 18 carbon atoms, said ligand having a Δ HNP value of at least about 425; and (4) at least 2 mols of free ligand as defined above per mol of rhodium; (5) at a temperature in the range of from about 50°C. to 145°C.; (6) at a total pressure of carbon monoxide and hydrogen of less than about 450 psia; and (7) a partial pressure attributable to carbon monoxide no greater than about 75 per cent of said total pressure; (8) thereby reacting said alpha olefinic compound with said carbon monoxide and hydrogen with the formation of oxygenated products rich in normal aldehydes which have one more carbon atom than said alpha olefinic compound.

2. The process of claim 1 wherein said ligand is a triarylphosphine.

3. The process of claim 2 wherein said ligand is triphenylphosphine.

4. The process of claim 1 wherein there is at least about 5 mols of free ligand per mol of rhodium and a partial pressure attributable to hydrogen of at least about 50 percent of said total hydrogen and carbon monoxide pressure.

5. The process of claim 4 wherein the total pressure of carbon monoxide and hydrogen is less than about 350 psia.

6. The process of claim 4 wherein the ligand is a triarylphosphine.

7. The process of claim 6 wherein said triarylphosphine is triphenylphosphine.

* * * * *

UNITED STATES PATENT OFFICE
CERTIFICATE OF CORRECTION

Patent No. 3,917,661                 Dated November 4, 1975

Inventor(s)    R. L. Pruett and J. A. Smith

It is certified that error appears in the above-identified patent and that said Letters Patent are hereby corrected as shown below:

See "Table I$(1)$", column 8, after heading "$pH^2/pCO$", Footnote (2) should be inserted, note Table II should read --$pH_2/pCO(2)$--.

See "Table VIII-Continued" column 12 under heading "Temp. of Ex. 40 °C" "$N$60" should read --110--.

See "Table VIII-Continued" column 12 under heading "Reaction Time Min." of Ex. 40, "6.1:1 should read -- $N$60--.

See "Table VIII-Continued" column 12 under heading "Normal/Iso Aldehydes of Ex. 40 "6.1:1" was omitted from last column.

See Table IX, under column heading "catalyst$(1)$", corresponding with Example 50, "Rh/c" was omitted.

See Table IX, omit "Rh/c" below table, delete from first line above footnote (1).

Signed and Sealed this twenty-fifth Day of May 1976

[SEAL]

Attest:

RUTH C. MASON
Attesting Officer

C. MARSHALL DANN
Commissioner of Patents and Trademarks